United States Patent [19]

Jang

[11] Patent Number: 5,480,296
[45] Date of Patent: Jan. 2, 1996

[54] TRANSFER MOLDING APPARATUS FOR ENCAPSULATING AN ELECTRICAL ELEMENT IN RESIN

[75] Inventor: Keun Y. Jang, Kyungsangbook-Do, Rep. of Korea

[73] Assignee: Goldstar Electron Co., Ltd., Choongchungbook-Do, Rep. of Korea

[21] Appl. No.: 264,045

[22] Filed: Jun. 22, 1994

Related U.S. Application Data

[63] Continuation-in-part of Ser. No. 983,957, Dec. 1, 1992, abandoned.

[30] Foreign Application Priority Data

Feb. 15, 1992 [KR] Rep. of Korea .................... 2222/1992

[51] Int. Cl.$^6$ ...................... B29C 45/02; B29C 45/14; B29C 45/40
[52] U.S. Cl. .................. 425/116; 249/67; 264/272.17; 425/121; 425/129.1; 425/544; 425/556; 425/444; 425/DIG. 228
[58] Field of Search ...................... 249/67, 95; 425/116, 425/117, 121, 129.1, 544, 588, 556, 444, DIG. 228; 264/272.17

[56] References Cited

U.S. PATENT DOCUMENTS

| | | |
|---|---|---|
| 3,044,121 | 7/1962 | Wiskoff et al. . |
| 3,794,286 | 2/1974 | Jullien-Davin . |
| 4,009,979 | 3/1977 | Martin . |
| 4,126,292 | 11/1978 | Saeki et al. . |
| 4,386,898 | 6/1983 | Sera . |
| 4,388,265 | 6/1983 | Bandoh . |
| 4,599,062 | 7/1986 | Konishi . |
| 5,061,164 | 10/1991 | Sabado et al. . |
| 5,252,051 | 10/1993 | Miyamoto et al. ...................... 425/116 |
| 5,366,368 | 11/1994 | Jang ......................................... 425/544 |

FOREIGN PATENT DOCUMENTS

| | | | |
|---|---|---|---|
| 2900114 | 2/1980 | Germany ........................... 264/272.17 |
| 57-5338 | 12/1982 | Japan . |
| 60-170600 | 4/1985 | Japan . |
| 61-292926 | 12/1986 | Japan . |
| 61-292329 | 12/1986 | Japan ................................. 264/272.17 |
| 62-273742 | 11/1987 | Japan . |
| 63-25011 | 2/1988 | Japan ................................. 264/272.17 |
| 1-117038 | 9/1989 | Japan . |
| 1-285319 | 11/1989 | Japan ..................................... 425/544 |
| 292809 | 1/1971 | U.S.S.R. . |

Primary Examiner—Khanh P. Nguyen
Attorney, Agent, or Firm—Lowe, Price, LeBlanc & Becker

[57] ABSTRACT

An improved transfer molding apparatus is provided for molding a preheated resin under pressure to thereby encapsulate a small element, such as a semiconductor device or package. In one aspect of the invention, the improvement consists of providing a shortened pot into which a piston is forcibly pressed to generate a flow of preheated resin in the encapsulating process, the improvement comprising the replacement of a single-element top drive plate, as found in a conventional apparatus, by a two-piece top drive plate which enables a shortening of the pot and corresponding reduction in the amount of air that would otherwise be trapped between the plunger and the resin during the process. The elimination of this air significantly reduces foaming, porosity, voids, and other defects in the cured resin which finally surrounds the electrical elements encapsulated thereby. In another aspect of the invention, a single top drive plate of a thickness comparable to that in conventional apparatus is used, the improvement being realized by forming a recess to leave a floor of relatively small thickness immediately around an upper end of the pot into which the plunger is moved to pressurize preheated resin.

2 Claims, 7 Drawing Sheets

TRANSFER MOLDING APPARATUS FOR ENCAPSULATING AN ELECTRICAL ELEMENT IN RESIN

This is a Continuation-In-Part of U.S. patent application Ser. No. 07/983,957, filed on Dec. 1, 1992, now abandoned.

FIELD OF THE INVENTION

This invention relates to transfer molding apparatus for encapsulating small objects such as electrical elements in a cured resin, of a type which includes a top mold die fixed to a top platen and a bottom mold die fixed to a bottom mold platen of a transfer molding press, and more particularly to an improved transfer molding apparatus for encapsulating small elements by providing encapsulating heated resin through a shortened pot to avoid the occurrence of foaming, porosity, voids and wire sweep in the finished products.

DESCRIPTION OF THE BACKGROUND ART

FIGS. 1–3 hereof relate to a typical known or conventional transfer molding apparatus. As best seen in these figures, such a known transfer molding apparatus typically comprises an upper center block 2 of an upper metal mold, a top mold base 3 mounted on the top center block 2, and an ejector pin plate 4 fixed to a lower surface of top drive plate 5 which is located above the top mold base 3. The known apparatus also includes a relatively long cylindrical pot 6 through which a heated resin 8 is forcibly passed into a bottom center block 1 of a lower metal mold. The cylindrical pot 6 extends through the top drive plate 5, the ejector pin plate 4, the top mold base 3, and the top center block 2. A movable plunger 7 is provided for applying a force to the heated resin 8 by reciprocatively moving into an upper end of pot 6 above the resin 8.

As best seen in FIG. 1, the known apparatus includes chases 9, 9' mounted on opposite sides of the top center block 2, riser blocks 10, 10' mounted on the top mold base 3, and clamp blocks 11, 11' mounted uppermost for clamping the upper metal mold downwardly toward the lower metal mold.

In the conventional transfer molding apparatus per FIGS. 1–3, there are also provided one or more top cavity runner ejector pins 21, top center block runner ejector pins 22, top ejector cavity pins 23, top drive plate spring 24 and top return pin 25. See, in particular, FIG. 2.

The above-described known apparatus also includes bottom chases 30, 30', bottom cavity runner ejector pins 31, bottom drive plate spring 32, bottom mold base 33, bottom ejector pin plate 34, bottom drive plate 35, bottom cavity ejector pins 36 and bottom return pin 37. Note, in FIG. 2, the parting line at which the upper and lower mold dies meet and separate in the process of encapsulating small electrical elements in molded resin.

In general operation with such a known apparatus, after a lead frame comprising one or more small objects, e.g., electrical units, is loaded on a bottom mold die (not shown) which has been previously adequately heated, the upper and bottom mold dies are clamped to each other by operating the apparatus. Typically, the bottom mold die may be held stationary and the upper mold die may be pressed downwardly thereto. Upon clamping of the upper and bottom mold dies, the top cavity ejector pins 23, the top cavity runner ejector pins 21, and the top center block runner ejector pin 22, all of which are slightly projected from the immediately adjacent surfaces of the cavity and the runner through which they pass, are pushed upwardly by the top return pin 25 which is fixed to the top drive plate 5.

The ejector pin plate 4 is fixed to the top drive plate 5 by means of a bolt (not shown), and the top drive plate 5, and the ejector pin plate 4 all move together under a biasing force applied by the top return pin 25.

Upon completion of a molding cycle, and when the apparatus is opened, the top drive plate 5 descends under a biasing force provided by the top drive plate spring 24 which is mounted to the top drive plate 5. Also, the top cavity ejector pin 23 descends so that the molded product is separated from the molding dies.

In such a conventional prior art apparatus, the top drive plate 5 is provided as a single integral element having a thickness "t" through which the upper end of pot 6 must extend to its upper opening into which plunger 7 is forcibly introduced. An undesirable consequence of this is that an amount of air corresponding to the volume in pot 6 within a length corresponding to thickness "t" is entrapped between the bottom surface of plunger 7 and the top surface of heated resin 8 contained in pot 6. Plunger 7 then descends over the entrapped air into pot 6 to apply pressure to the heated resin 8 to inject it into the space defined between the top and bottom dies to surround and encapsulate the small electrical elements placed therein. The entrapped air is thus pressurized and becomes intermingled with the heated flowing resin to creating foaming and voids, etc. The result is that the electrical elements are not properly and uniformly encapsulated.

As persons of ordinary skill in the art will appreciate, such inadequate insulation of electrical elements can lead to highly undesirable electrical shorting under diverse operating conditions. This specific problem is addressed by the present invention, and the solution requires a relatively simple but highly effective structural change from the conventional prior art apparatus as described above. This structural improvement results in vastly improved products in which foaming, porosity and other known defects in the encapsulating cured resin are significantly reduced or substantially eliminated.

SUMMARY OF THE INVENTION

A principal object of the present invention is to provide a transfer mold apparatus for flowing a heating resin under pressure to surround objects, e.g., semiconductor elements, in a manner free of foaming, porosity, voids, and wire sweep.

It is a related object of this invention to provide an improved transfer mold apparatus which comprises many components of known type but is structured so that a pot, within which a plunger is reciprocably moved to pressurize heated resin, is shortened in such a manner that an amount of air that may be trapped between the plunger and the resin is significantly reduced or eliminated, to thereby reduce problems associated with foaming, porosity, voids and wire sweep in resin cured around objects to encapsulate the same.

Accordingly, it is a principal object of this invention to provide in a preferred embodiment a transfer molding apparatus which includes a lower metal mold having a lower center block and an upper center block disposed above the lower center block, with an upper mold base mounted above the upper center block. An ejector pin plate is located above the upper mold base, and an upper drive plate comprising two cooperating portions of the same thickness, spaced apart, is mounted above the ejector pin plate. A cylindrical pot of a predetermined length extends from an upper end close to an upper surface of the ejector pin plate and between the spaced apart positions of the upper drive plate. The cylindrical pot passes through the upper mold base, the upper center block, so that the upper end of the pot is located within the space defined between the spaced apart portions of the upper drive plate. A center block ejector pin plate is mounted below the ejector pin plate and extends around the pot. A plunger is disposed to be reciprocable inside the pot to press a quantity of heated resin provided therein into the lower center block.

In another aspect of this invention, there is provided a transfer molding apparatus which is generally similar to the above-described preferred embodiment, the difference being that the upper drive plate is formed as a single element having a predetermined thickness "t" over most of its expanse, with a relief-cut recess formed therein to a depth "d" less than the thickness "t" to have a floor thickness "(t-d)" which is substantially less than the thickness "t", the upper drive plate also being mounted on the ejector pin plate.

In both of the above-described preferred embodiments, the overall length of the pot is reduced significantly, and this reduces an amount of air which is otherwise trapped between a lower surface of the plunger and an upper surface of resin contained in the pot. The result is that the heated resin forcibly moved from the pot to surround and encapsulate small objects contained between cooperating die elements below the pot is free of porosity, foaming, and other defects which are frequently encountered in apparatus known in the prior art.

DETAILED DESCRIPTION OF THE PREFERRED EMBODIMENT

Figure 2:
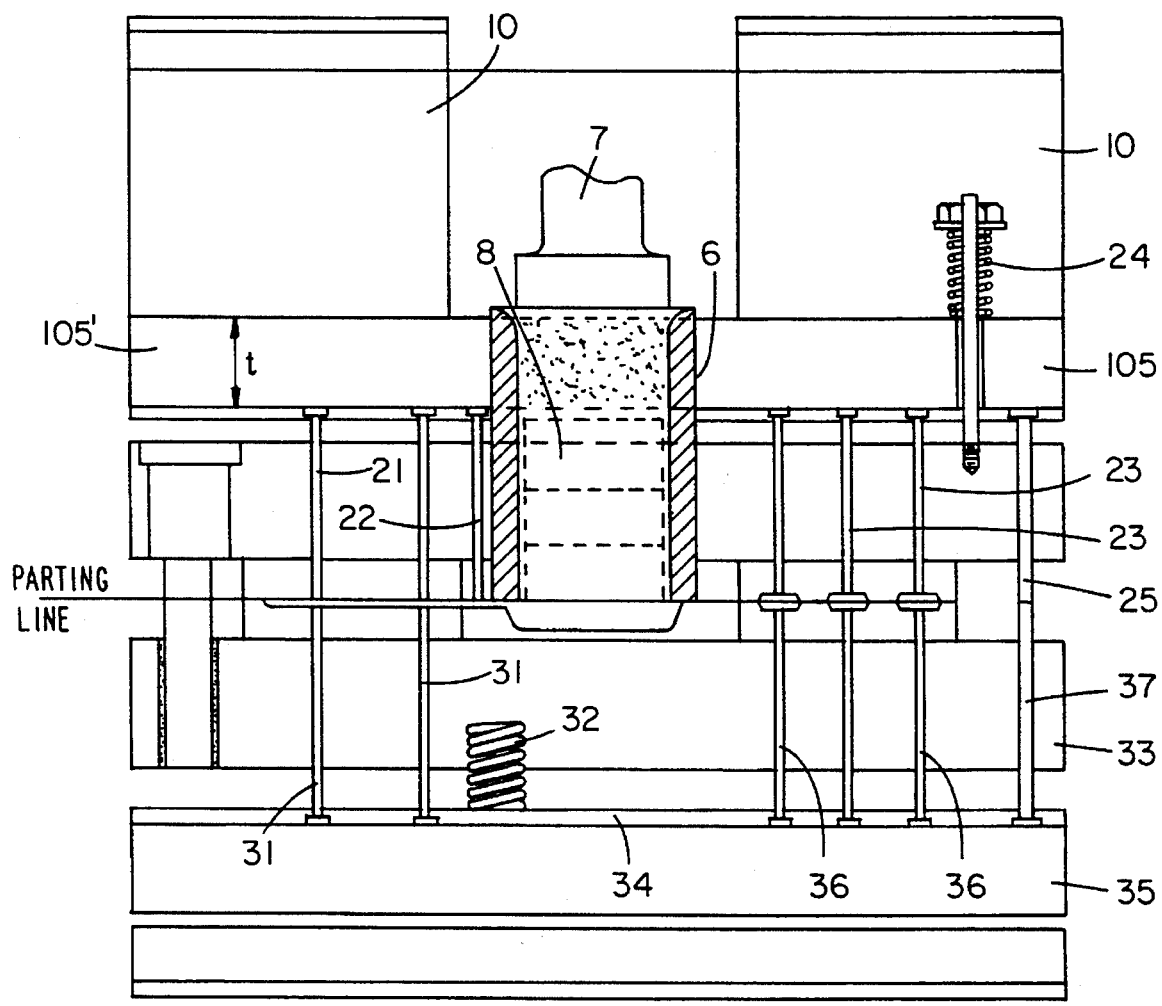
FIG. 2 is a vertical cross-sectional view illustrating principal elements of the prior art apparatus according to FIG. 1.
Figure 3:
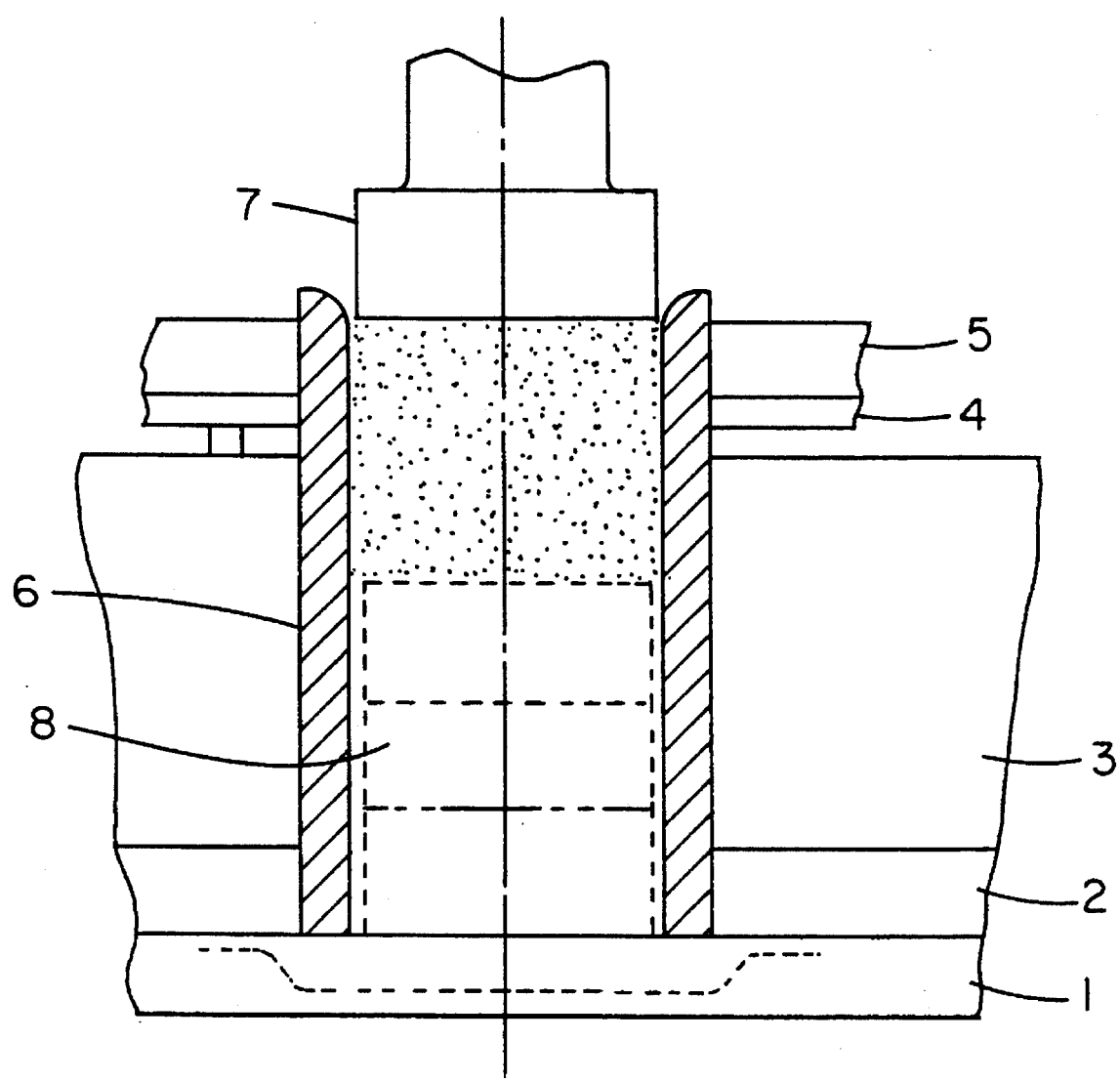
FIG. 3 is an enlarged view of the pot and portions of immediately adjacent elements, in cross-sectional view, according to the embodiment per FIGS. 1 and 2.

As noted, the top drive plate of the prior art has a thickness "t", as best understood with reference to FIGS. 2 and 3. As best seen in FIG. 2, there is a volume of air corresponding to this thickness "t" which gets entrapped between the lower surface of plunger 7 and the upper surface of preheated resin 8.

Figure 4:
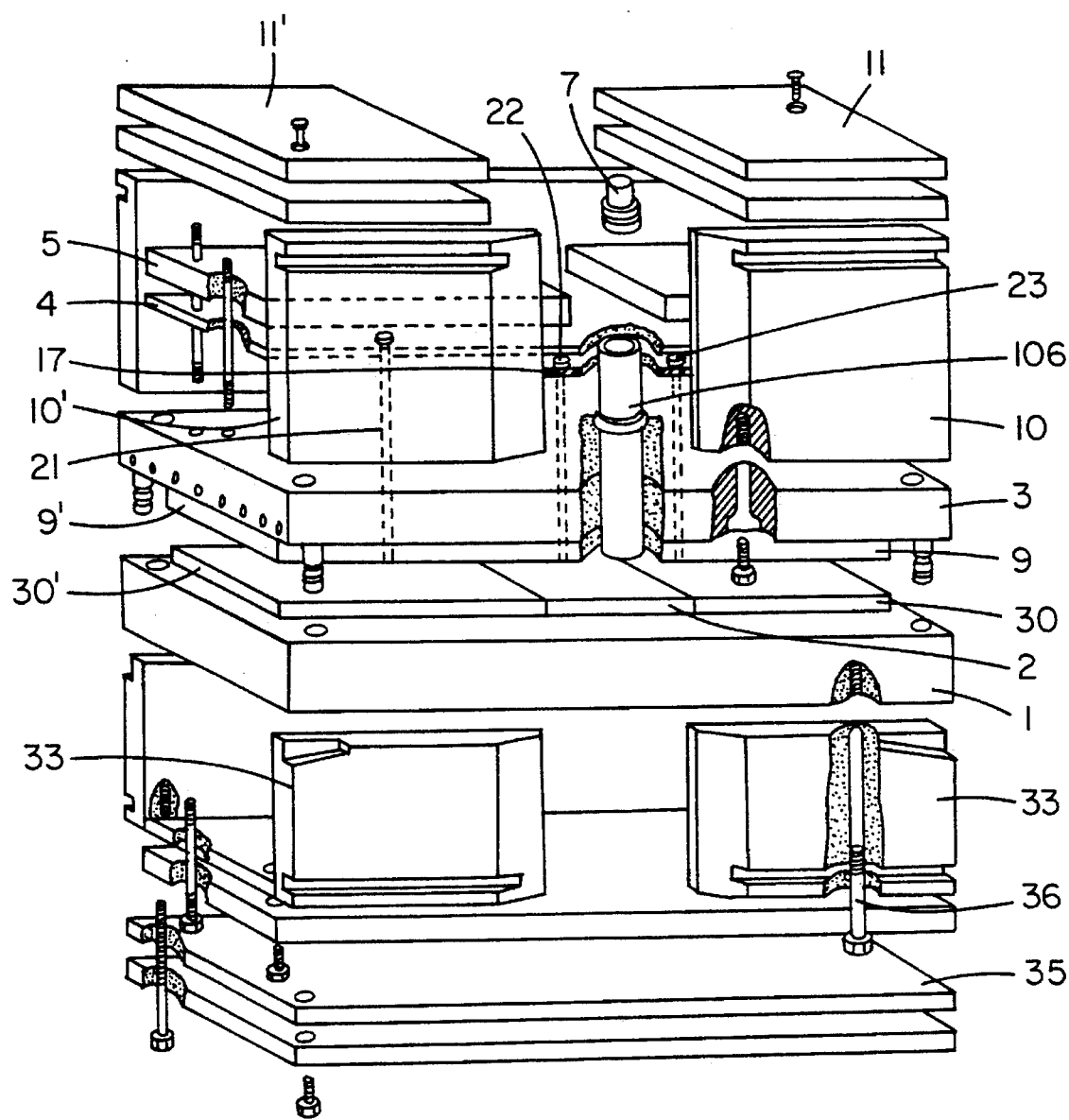
FIG. 4 is a partially sectioned exploded perspective view of a transfer mold apparatus according to a preferred embodiment of this invention.
Figure 5:
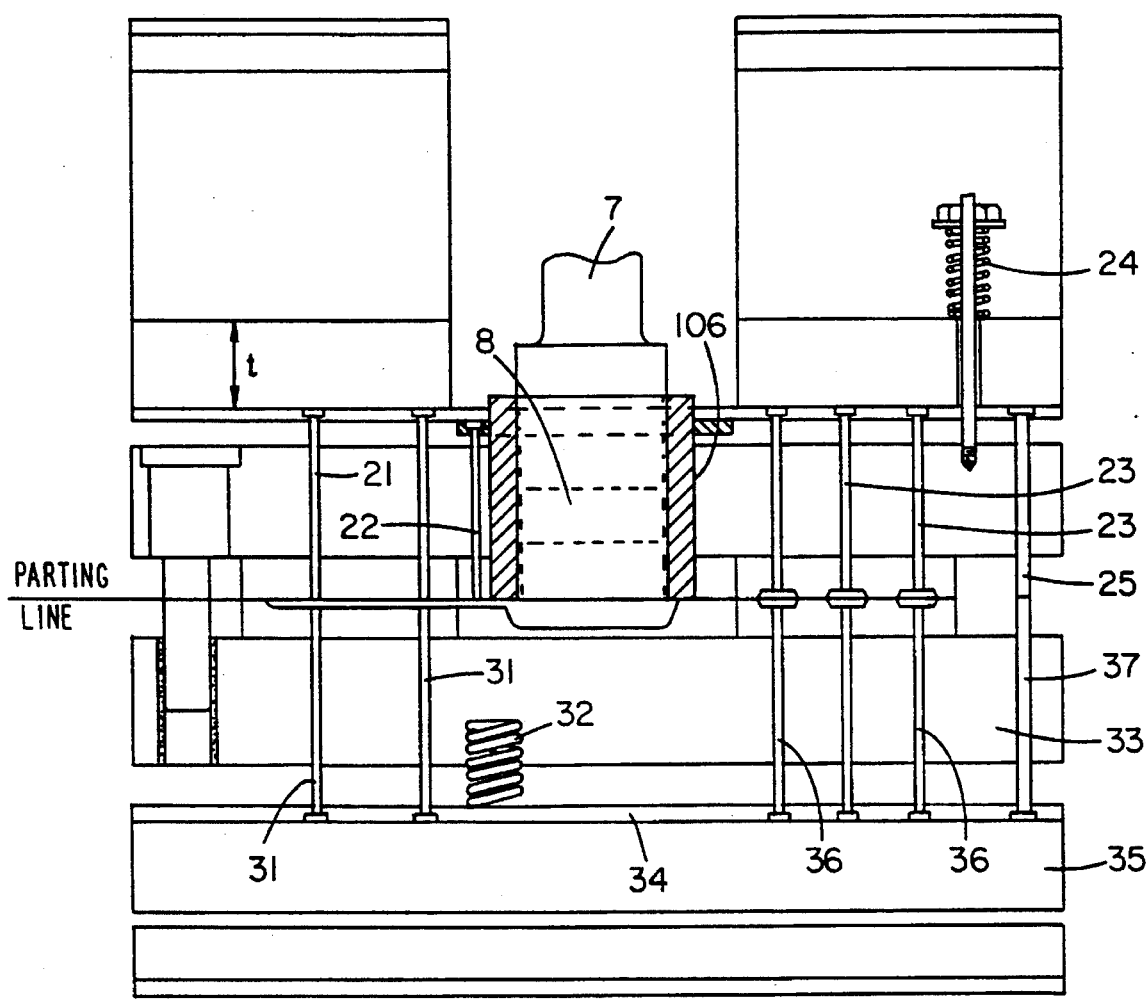
FIG. 5 is a vertical cross-sectional view of the principal elements of the preferred embodiment per FIG. 4.
Figure 6:
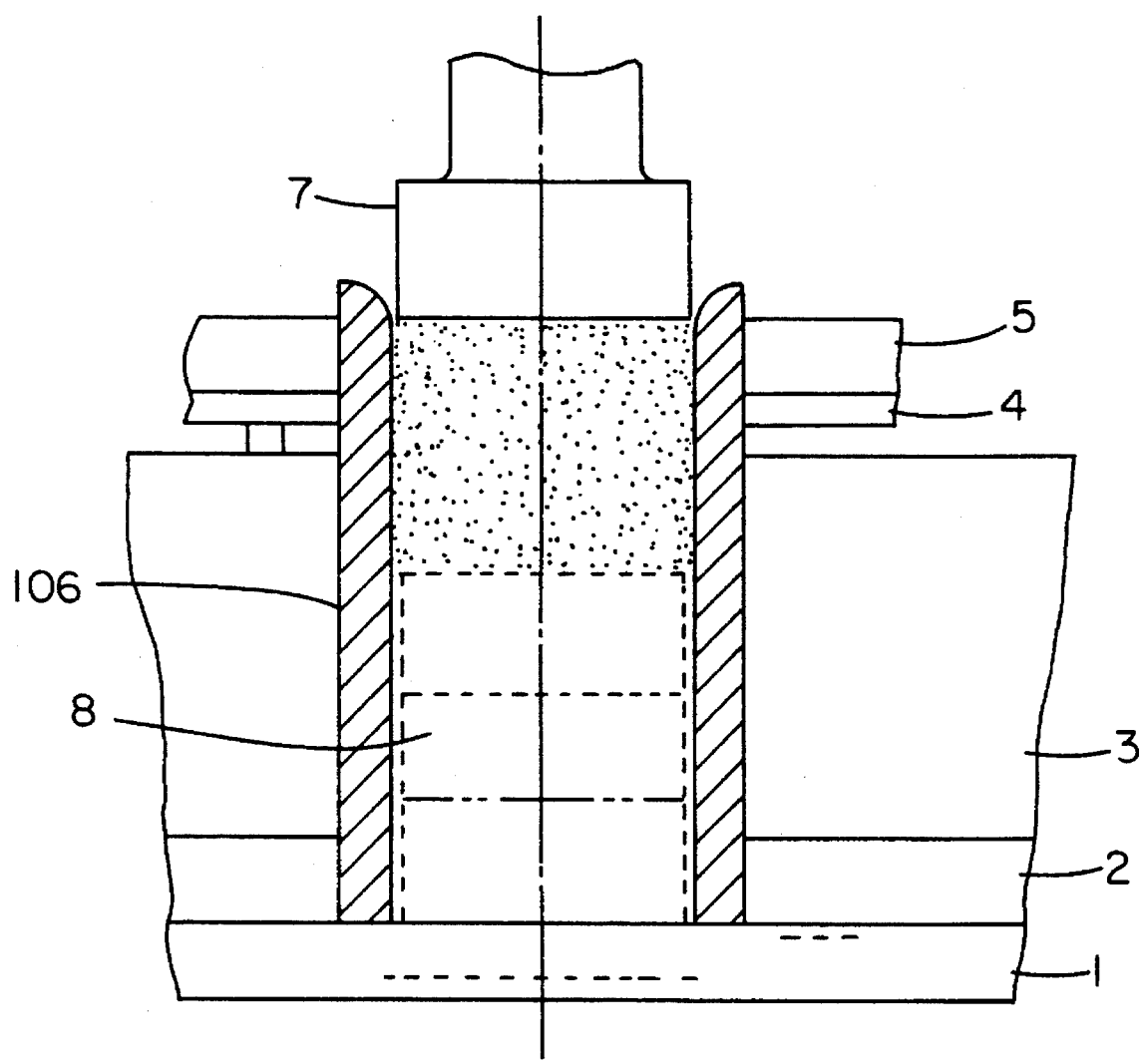
FIG. 6 is an enlarged vertical cross-sectional view of the pot and immediately adjacent elements of the preferred embodiment per FIGS. 4 and 5.

In contrast to the known prior art, in the preferred embodiment according to FIGS. 4–6 the upper drive plate 5 of the prior art is replaced by equally thick right and left top drive plates 105, 105' separated by a distance somewhat larger than the outermost diameter of the upper portion of a shortened pot 106. Pot 106 has a length smaller than the length of the conventional pot 6 by a distance corresponding to the thickness "t" when the top drive plates 105, 105' are made of the same thickness as the single top drive plate 5 according to the prior art as described above.

In the first preferred embodiment, this simple structural change by itself is instrumental in accomplishing the desired result, i.e., the significant and substantial reduction in the amount of air entrapped between the bottom surface of plunger 7 and the top surface of preheated resin 8 contained in the shortened pot 106. Since the top drive plate portion which would otherwise have been disposed over the top center block 2 is eliminated, the top center block runner ejector pins 22 cannot be mounted as in the prior art. Accordingly, in order to fix the top center block runner ejector pins 22, a top center block ejector pin plate 17 is provided, as best seen in FIG. 4. In this manner, the top runner ejector pins 22 and the top cavity ejector pins 21 are fixed between the top drive plates 105, 105' and the top ejector pin plate 4, and the top center block runner ejector pin 22 is fixed between the top ejector pin plate 4 and the top center block ejector pin plate 17.

With the above-described structure of the preferred embodiment, when during operation of the apparatus the top mold and the bottom mold are separated from each other, the top cavity runner ejector pins 21 and the top center block runner ejector pins 22 are protruded about 3–5 mm from the surfaces of the runner, the center block runner and cavity. However, when the top mold and the bottom mold are pressed to each other, the top drive plates 105, 105' are pushed upwardly by the action of the return pin 25 which is fixed between the upper and bottom molds so that the top runner ejector 21, the top center block runner ejector pins 22 and the top cavity ejector pin 23, which are all fixed between the top drive plates 105, 105', the top ejector drive pin plate 4, and the top center block ejector pin plate 17, are simultaneously pushed upwardly. When the top mold and the bottom mold are separated from each other at the completion of a molding process, the return spring 25 pushes downwardly relative to the top drive plates 105, 105', to that the ejector pins fixed to the top drive plates 105, 105' are moved downwardly simultaneously with the same. At this time, the top runner ejector pins 22 push down on the resin which is molded within the runner, the top center block runner ejector pin is pushed down on resin which is molded at the center block, and the top cavity ejector pin pushes downwardly on resin which is molded at the cavity, so that the molded resins and encapsulated items are all simultaneously and cleanly separated from the mold dies.

It will be appreciated by persons of ordinary skill in the art that the bulk of the elements comprising the improved apparatus according to the above-described preferred embodiment and what is known in the prior art are quite similar and operate in similar manner. The key to the success of this embodiment of the present invention in reducing foaming, porosity, and the like in the molded resin encapsulating the small electrical elements lies in the elimination of the volume of air corresponding to the thickness "t" of the top drive plate which in the prior art was a single element of such a thickness. Replacing the single element top drive plate 5 of the prior art by a pair of cooperating top side plates 105, 105', and the provision of a top center block runner ejector pin plate 17, involves what may appear to be only a small structural change in the apparatus. The results, however, provide significant benefits and result in a more reliable product, lower wastage, and greater economy in the manufacturing of resin-encapsulated elements.

Figure 7:
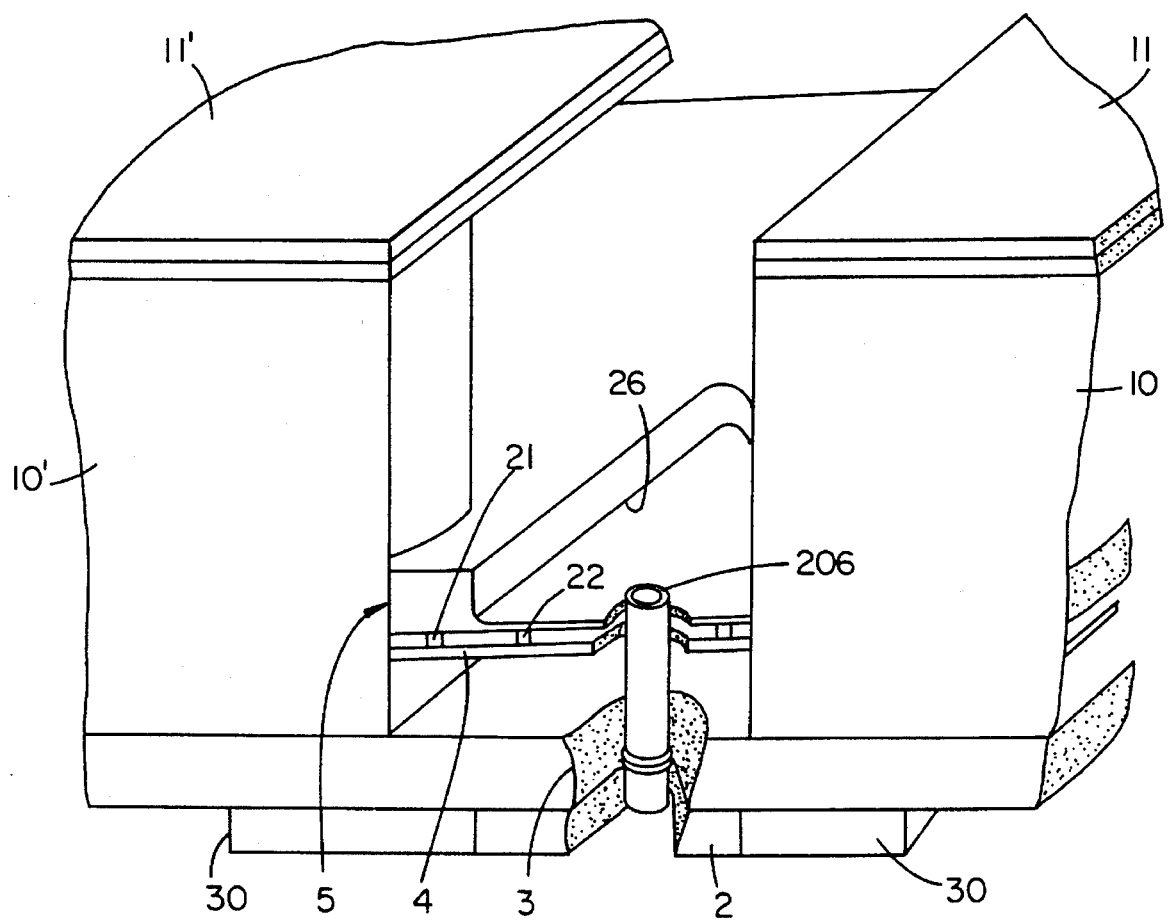
FIG. 7 is a partially sectioned perspective view of another preferred embodiment of this invention.

FIG. 7 is a partially sectioned perspective view of another preferred embodiment of this invention. In this embodiment, the top drive plate 5 of the prior art is not replaced by two top side plates 105, 105' and a top center block runner ejector pin plate 17. Instead, there is a provided a single element top drive plate 205 that has a thickness "t" comparable to that of the prior art over most of its expanse. However, in this particular embodiment there is formed a recess 26 of a depth "d" which is smaller than the thickness "t" in the area immediately surrounding the uppermost end of pot 206. The floor of the recess therefore has a thickness "(t-d)" immediately around the upper end of pot 206. All other elements of the apparatus according to this embodiment are similar to those described above, and are operated in the same manner.

Figure 1:
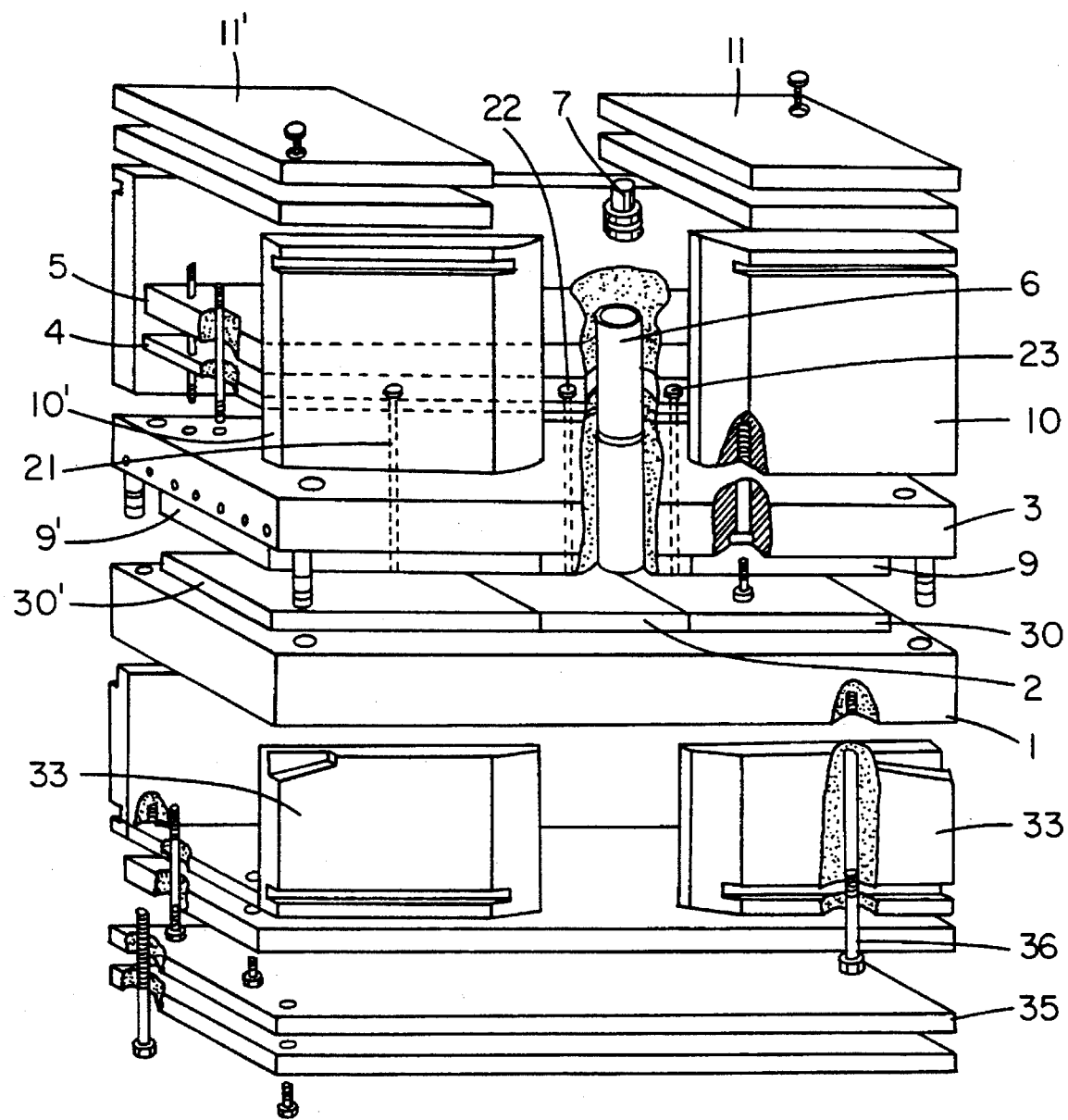
FIG. 1 is a partially exploded perspective view of a known transfer mold apparatus.

The advantage of the embodiment per FIG. 7 over the apparatus according to the prior art per FIGS. 1–3 lies in the shortening of the pot 206 by a length corresponding to the recess depth "d" in length. The beneficial result is that when a plunger 7 is forcibly moved into the top end of pot 206, as will be readily understood by persons of ordinary skill in the art by reference to the various drawing figures, an amount of air trapped between the lower end of such a plunger 7 and the top surface of preheated resin 8 contained in the shortened pot 206 will have a volume less than that in the apparatus according to the prior art, this volume corresponding to the internal cross-sectional area of the pot 206 and its reduction in height corresponding to the distance "d". Thus, simply by providing a recess in the top drive plate 205 in the region immediately surrounding the top of shortened pot 206 there is a significant reduction in the amount of entrapped air and the consequential foaming, porosity, voids, and the like in the cured resin encapsulating the small elements encapsulated by the improved apparatus.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A transfer molding apparatus, comprising:

a lower metal mold having a lower center block;

an upper center block disposed above the lower center block;

an upper mold base mounted above the upper center block;

an ejector pin plate located above the upper mold base;

an upper drive plate of thickness "t", comprising two cooperating portions of the same thickness and spaced apart and mounted above the ejector pin plate;

a cylindrical pot of a predetermined length, extending from an upper end close to an upper surface of the ejector pin plate and between said spaced apart portions of said upper drive plate, through the upper mold base, and through the upper center block to a lower surface of the upper center block, the upper end of the pot being located within a space defined between the spaced apart portions of the upper drive plate;

a center block ejector pin plate mounted below the ejector pin plate and extending around the pot, the ejector pin plate being formed to have a first cavity to receive an upper end of a center block runner ejector pin, the center block ejector pin plate being formed to have a second cavity to receive an upper end of a center block ejector pin, the upper mold base and the upper center block each being formed with corresponding through apertures aligned to provide respective passages to the center block runner ejector pin and the center block ejector pin respectively; and a plunger disposed to be reciprocable inside the pot to press a quantity of heated resin provided therein into the lower center block.

2. A transfer molding apparatus, comprising:

a lower metal mold having a lower center block;

an upper center block disposed above the lower center block;

an upper mold base mounted above the upper center block;

an ejector pin plate located above the upper mold base;

an upper drive plate of a predetermined thickness "t", having a relief-cut recess formed therein to a depth "d" less than the thickness "t" to have a floor thickness "(t-d)" which is substantially less than said thickness "t" of said upper drive plate, mounted on the ejector pin plate;

a cylindrical pot of a predetermined length which extends from an upper end close to a floor surface of the recess in the upper drive plate, through the ejector pin plate, through the upper mold base, and through the upper center block to a lower surface of the upper center block;

a center block ejector pin plate mounted below the ejector pin plate around the pot, the ejector pin plate being formed to have a first cavity to receive an upper end of a center block runner ejector pin, the center block ejector pin plate being formed to have a second cavity to receive an upper end of a center block ejector pin, the upper mold base and the upper center block each being formed with corresponding through apertures aligned to provide respective passages to the center block runner ejector pin and the center block ejector pin respectively; and a plunger disposed to be reciprocable inside the pot to press a quantity of heated resin provided therein into the bottom center block.

* * * * *